(12) United States Patent
Wears et al.

(10) Patent No.: US 7,854,239 B2
(45) Date of Patent: Dec. 21, 2010

(54) HIGH TEMPERATURE VALVE

(75) Inventors: William E. Wears, Marshalltown, IA (US); Galen D. Wilke, Ames, IA (US); John Christen, Waterloo, IA (US)

(73) Assignee: Fisher Controls International LLC, St. Louis, MO (US)

( * ) Notice: Subject to any disclaimer, the term of this patent is extended or adjusted under 35 U.S.C. 154(b) by 473 days.

(21) Appl. No.: 12/041,169

(22) Filed: Mar. 3, 2008

(65) Prior Publication Data
US 2009/0218536 A1   Sep. 3, 2009

(51) Int. Cl.
*F16K 1/42*   (2006.01)
(52) U.S. Cl. .............................. 137/625.4; 137/625.42; 251/363
(58) Field of Classification Search ................. 251/282, 251/359, 360, 361, 363; 137/602, 883, 118.02, 137/625, 625.4, 625.42
See application file for complete search history.

(56) References Cited

U.S. PATENT DOCUMENTS

| | | | |
|---|---|---|---|
| 1,364,848 A | | 1/1921 | Walsh |
| 2,934,090 A | | 4/1960 | Kenann et al. |
| 3,771,562 A | * | 11/1973 | Curran .................... 137/625.4 |
| 4,128,110 A | * | 12/1978 | Haytayan ............... 137/625.27 |
| 4,621,656 A | * | 11/1986 | Ichimaru ............... 137/625.66 |
| 4,773,442 A | * | 9/1988 | Lephilibert ................. 251/363 |
| 5,156,181 A | * | 10/1992 | Maalouf et al. ............ 251/363 |
| 5,247,960 A | * | 9/1993 | Kornfeldt et al. ........... 251/363 |
| 6,003,551 A | * | 12/1999 | Wears .................... 137/625.33 |
| 6,691,982 B1 | * | 2/2004 | Jacobsson ................... 251/363 |
| 2005/0023497 A1 | | 2/2005 | Gethmann |
| 2006/0049375 A1 | | 3/2006 | Gossett |

FOREIGN PATENT DOCUMENTS

| | | |
|---|---|---|
| DE | 26 12 771 | 9/1977 |
| FR | 1301193 | 7/1962 |
| GB | 2 071 279 | 9/1981 |

OTHER PUBLICATIONS

International Search Report for PCT/US2009/031464, mailed May 6, 2009.

* cited by examiner

*Primary Examiner*—John Bastianelli
(74) *Attorney, Agent, or Firm*—Marshall, Gerstein & Borun LLP

(57) ABSTRACT

A trim assembly for a control valve includes a seal for sealing a leak path, where the seal is provided to perform advantageously in high-temperature applications, e.g., applications including temperatures of at least 450° F. (232.22° C.). The control valve comprises a valve body and control element. The control element is disposed within the valve body for controlling the flow of fluid therethrough. The trim assembly comprises a valve seat and a retention ring. The valve seat is fixed to the valve body, and the retention ring is threadably connected to the valve seat. The seal can be effected by an annular graphite seal compressed between the trim assembly and the valve body, or by a metal-to-metal contact between the retention ring and the valve body.

39 Claims, 11 Drawing Sheets

HIGH TEMPERATURE VALVE

FIELD OF THE INVENTION

The present invention is generally related to control valves, and more particularly, to control valves suitable for use in high temperature applications.

BACKGROUND

It is generally understood that in certain process applications two or more pipelines are sometimes connected for transporting fluids between two or more locations, or for performing flow-mixing or flow-splitting applications. Typically, valves include a control element such as a valve plug and one or more internal components acting together to control the flow of fluid through the valve body.

The various internal components are often referred to as the valve trim. Typical valve trim includes one or more valve seats, for example, secured within the valve body. A consequence of using multiple components to achieve a desired valve trim, however, is that leak paths can form at the interfaces thereof. To seal these leak paths, typical trim assemblies incorporate rubber o-rings or similarly constructed gaskets. These materials, however, are only effective up to approximately 450° F. (232.22° C.). Therefore, different solutions are required for applications being performed above 450° F. (232.22° C.).

SUMMARY

One embodiment of the present invention comprises a trim assembly for a fluid flow control device, where the fluid flow control device comprises a valve body and a control element. The valve body defines an inlet, an outlet, and a throat disposed between the inlet and the outlet. The control element is disposed within the throat of the valve body and adapted for displacement between a first position and a second position for controlling the flow of fluid through the valve body. The trim assembly comprises a valve seat and a retention ring. The valve seat is fixed to the valve body within the throat, and the retention ring is threadably connected to the valve seat. A seal is provided between the trim assembly and the valve body, which prevents leakage and is capable of withstanding temperatures of at least 450° F. (232.22° C.).

In one embodiment, the seal can comprise an annular seal including a graphite material that is compressed between the valve seat and the retention ring and in engagement with the valve body to provide a fluid tight seal. The graphite material helps ensure that the seal can withstand operational temperatures at least 450° F. (232.22° C.).

In another embodiment, the seal can comprise a metal-to-metal contact between the retention ring and the valve body.

DETAILED DESCRIPTION

Figure 1:
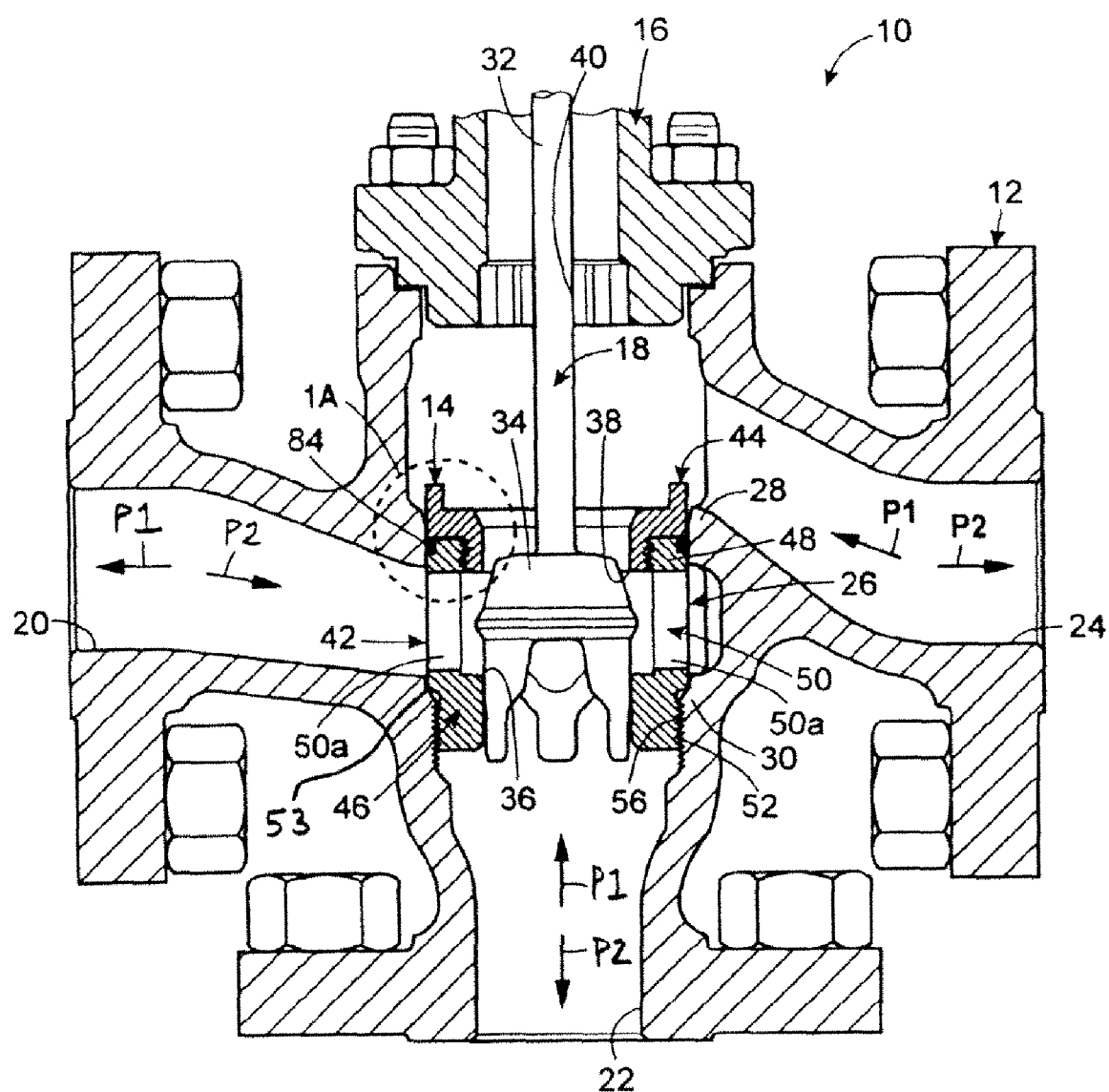
FIG. 1 is a cross-sectional side view of a first embodiment of a fluid flow control device constructed in accordance with the principles of the present invention.

FIG. 1 depicts one embodiment of a fluid flow control device, e.g., a control valve 10, constructed in accordance with the present invention and adapted to operate at high temperatures, e.g., temperatures of at least 450° F. (232.22° C.). In FIG. 1, the control valve 10 comprises an unbalanced three-way control valve 10 that may be used in either a converging or a diverging flow application. The control valve 10 generally comprises a valve body 12, a trim assembly 14, a bonnet 16, and a control element 18. The valve body 12 includes a first port 20, a second port 22, a third port 24, and a throat 26. Additionally, the valve body 12 includes an upper web 28 and a lower web 30. The throat 26 is generally defined as extending between the upper and lower webs 28, 30 of the valve body 12. The control element 18 is adapted to be displaced relative to the trim assembly 14 to control the flow of fluid therethrough, as will be described.

In the case of the valve 10 serving a converging application, a flow path, which is identified by reference character P1 in FIG. 1, includes the second and third ports 22, 24 serving as inlet ports, and the first port 20 serving as a common outlet port. In the case of the valve 10 serving a diverging application, a flow path, which is identified by reference character P2 in FIG. 1, includes the first port 20 serving as an inlet port, and the second and third ports 22, 24 serving as outlet ports. So configured, the disclosed embodiment defines the three-way control valve 10 as a "side port common" valve. In either application, the trim assembly 14 and the control element 18 functions generally the same.

For example, in the disclosed unbalanced configuration, the control element 18 comprises a stem 32 and an unbalanced valve plug 34. The unbalanced valve plug 34 comprises a port-guided valve plug. The trim assembly 14 defines a first seating surface 36 disposed adjacent the lower web 30 of the valve body 12 and a second seating surface 38 disposed adjacent the upper web 28 of the valve body 12. The stem 32 of the control element 18 is slidably disposed within a bore 40 defined by the bonnet 16 such that the control element 18, and more particularly, the valve plug 34 of the control element 18, can be displaced between a first position in sealing engagement with the first seating surface 36 and a second position in sealing engagement with the second seating surface 38. With the valve plug 34 in the first position, the control element 18 closes the second port 22 and defines a flow path between the first and third ports 20, 24. With the valve plug 34 in the second position, the control element 18 closes the third port 24 and defines a flow path between the first and second ports 20, 22. By positioning the valve plug 34 between the first and second positions, the aforementioned converging and/or diverging flow applications can be achieved.

Figure 1A:
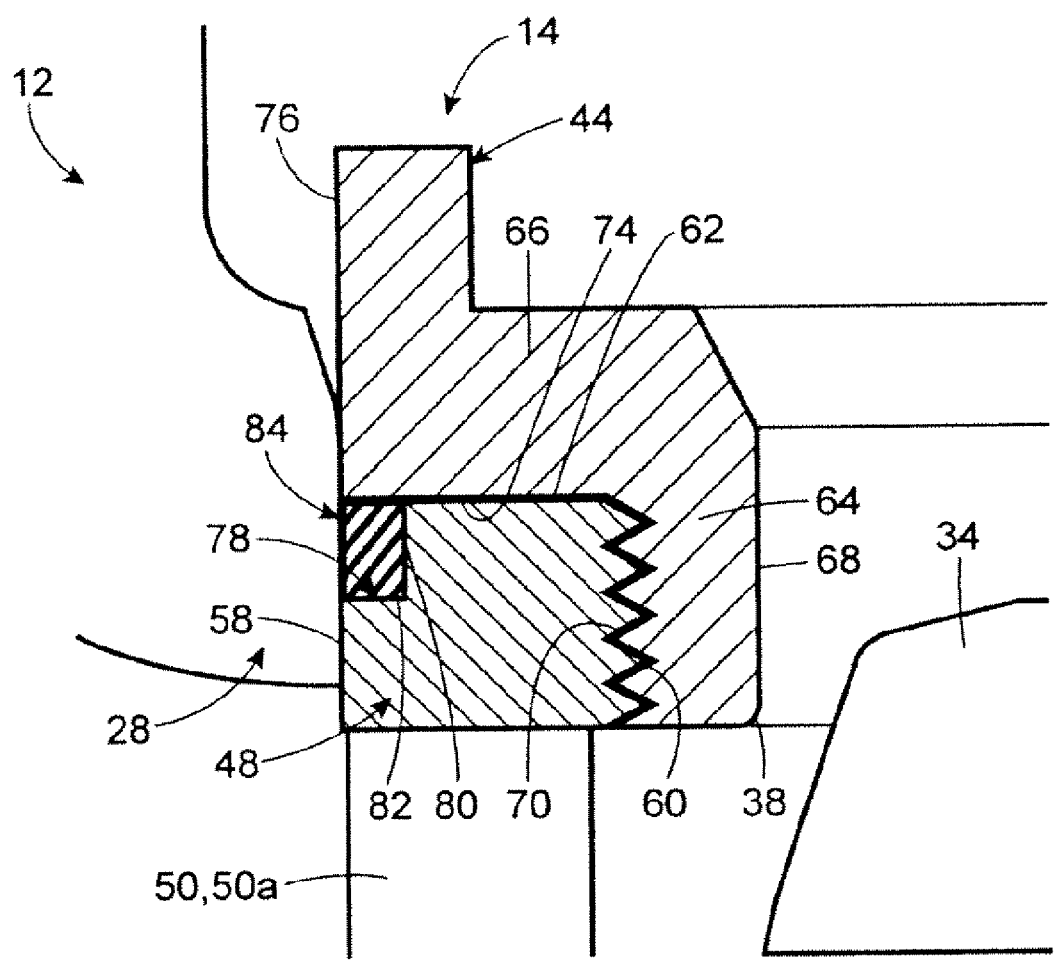
FIG. 1A is a partial detailed view of the fluid flow control device of FIG. 1 taken from circle 1A in FIG. 1.

Still referring to FIG. 1, and also to FIG. 1A, the trim assembly 14 of the presently described embodiment comprises a valve seat 42 and a retention ring 44. The valve seat 42 comprises a seat ring portion 46, an upper ring portion 48, and a window portion 50. The seat ring portion 46 is generally ring-shaped and includes a plurality of external threads 52, an external shoulder 53, and the first seating surface 36. The plurality of external threads 52 threadably engage a plurality of internal threads 56 formed on the lower web 30 of the valve body 12. So configured, the seat ring portion 46 fixes the valve seat 42 into the valve body 12, via threaded connection, and against displacement relative thereto. In one embodiment, the valve seat 42 is secured into the valve body 12 with sufficient torque that the external shoulder 53 formed on the seat ring portion 46 engages the lower web 30, as depicted. The engagement is preferably accomplished with a force sufficient to effect a metal-to-metal fluid-tight seal between the external shoulder 53 and the lower web 30. The window portion 50 defines a plurality of windows 50a, which are in fluid communication with the first, second, and third ports 20, 22, 24 of the valve body 12.

The upper ring portion 48 of the valve seat 42 is disposed opposite the throat 26 from the seat ring portion 46 and adjacent to the upper web 28 of the valve body 12. As depicted in FIG. 1A, the upper ring portion 48 includes a generally ring-shaped member having an outer cylindrical surface 58, a plurality of internal threads 60, and a top surface 62. The retention ring 44 is also generally ring-shaped and includes a fixation portion 64 and a compression portion 66. The fixation portion 64 includes an inner cylindrical surface 68 and a plurality of external threads 70. The inner cylindrical surface 68 defines the second seating surface 38. The plurality of external threads 70 are in threaded engagement with the plurality of internal threads 60 on the upper ring portion 48 of the valve seat 42. The compression portion 66 includes a bottom surface 74 and an outer cylindrical surface 76.

Still referring to FIG. 1A, the upper ring portion 48 of the present embodiment of the trim assembly 14 defines an annular recess 78. The annular recess 78 is disposed adjacent to the outer cylindrical surfaces 58, 76 of the upper ring portion 48 and retention ring 44, as well as adjacent to the bottom surface 74 of the compression portion 66 of the retention ring 44. More specifically, as illustrated in FIG. 1A, the annular recess 78 is defined by an inner wall 80 and a bottom wall 82 of the upper ring portion 48 of the valve seat 42. So configured, the annular recess 78 accommodates a seal 84 for providing a seal between the trim assembly 14 and the valve body 12. In the disclosed embodiment, the seal 84 comprises an annular-shaped seal having a generally rectangular cross-section, similar to the recess 78.

For example, during operation and when the valve plug 34 is in the second position engaging the second seating surface 38, fluid can leak along a leak path between the throat 26 and the third port 24 of the valve body 12. Specifically, fluid can leak from the throat 26 through the interface between the plurality of external threads 70 on the fixation portion 64 of the retention ring 44 and the plurality of internal threads 60 on the upper ring portion 48 of the valve seat 42. From here, fluid can leak through the interface between the top surface 62 of the upper ring portion 48 of the valve seat 42 and the bottom surface 74 of the compression portion 66 of the retention ring 44, then through any interface between the outer cylindrical surface 76 of the retention ring 44 and the upper web 28 of the valve body 12, and finally to the third port 24.

Accordingly, the seal 84, which is disposed within the annular recess 78, provides a fluid tight seal between the trim assembly 14 and the valve body 12, thereby sealing off this potential leak path. The seal 84 is compressed between the bottom surface 74 of the compression portion 66 of the retention ring 44 and the bottom wall 82 of the recess 78 of the upper ring portion 48 of the valve seat 42. This compression causes the seal 84 to sealingly engage the bottom surface 74 of the compression portion 66 of the retention ring 44 and the bottom wall 82 of the recess 78 of the upper ring portion 48 of the valve seat 42. Additionally, this compression causes the seal 84 to expand in a direction transverse to the compressive load, such that the seal 84 sealingly engages both the upper web 28 of the valve body 12 and the inner wall 80 of the recess 78 of the upper ring portion 48 of the valve seat 32. Therefore, it should be appreciated that the seal 84 of this embodiment serves as a static seal and provides a fluid tight seal in every direction to effectively seal off the above-described leak path between the trim assembly 14 and the valve body 12.

Figure 6:
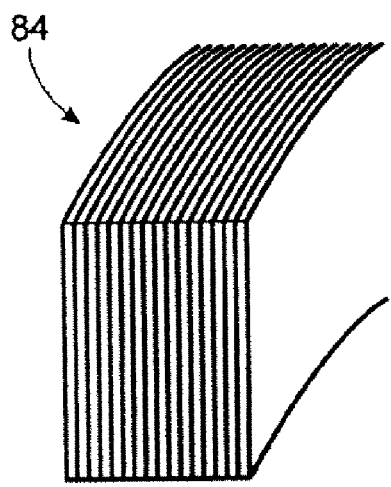
FIG. 6 is a cross-sectional view of one embodiment of a seal for use in a fluid flow control device constructed in accordance with the principles of the present invention.

In one embodiment, the seal 84 can be constructed of flexible graphite packing material or a graphite laminate ring. For example, in one embodiment, the seal 84 can be constructed of a wound graphite ribbon having at least 94.5% graphite content. So configured, a cross-section taken through the seal 84 can resemble a plurality of vertically aligned ribbons, as illustrated in FIG. 6, for example. The density of the seal 84 can be in the range of approximately 85 lb/ft$^3$ (1362 kg/m$^3$) to approximately 95 lb/ft$^3$ (1522 kg/m$^3$), and preferably 90 lb/ft$^3$ (1441 kg/m$^3$). In one embodiment, such graphite seal 84 can be constructed from Union Carbide grade GTK material or an equivalent material.

Figure 7:
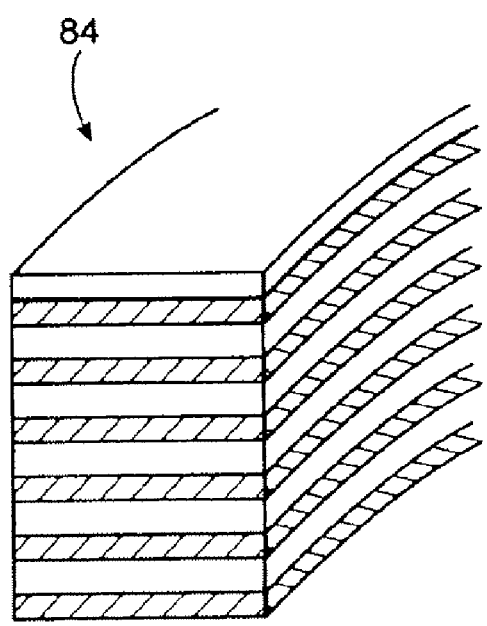
FIG. 7 is a cross-sectional view of another embodiment of a seal for use in a fluid flow control device constructed in accordance with the principles of the present invention.

In an alternative embodiment, the seal 84 can be constructed of alternating, stacked layers of flexible graphite sheets and polytetrafluoroethylene (PTFE) sheets bonded together by hot pressing, as illustrated in FIG. 7, for example. Preferably, the PTFE sheets comprise virgin PTFE sheets. In one embodiment, the seal 84 can comprise six layers of flexible graphite such as Grade GTJ Grafoil, each nominally 0.030" (0.76 mm) thick, alternating with five layers of 0.005" (0.13 mm) thick virgin PTFE, thereby defining a total nominal thickness of approximately 0.205" (5.2 mm). In this embodiment, the density of the seal can be in the range of approximately 85 lb/ft$^3$ (1362 kg/m$^3$) to approximately 95 lb/ft$^3$ (1522 kg/m$^3$).

In either of the above embodiments, the seal 84 can additionally comprise a non-metallic, inorganic, passivating inhibitor for corrosion and oxidation resistance.

With the seal 84 configured as described, the control valve 10 of the present embodiment can operate in applications having higher temperatures than standard control devices including rubber o-rings. Specifically, the presently disclosed embodiment can operate at temperatures greater than 450° F. (232.22° C.), without raising concern for the integrity of the seal 84.

Figure 2:
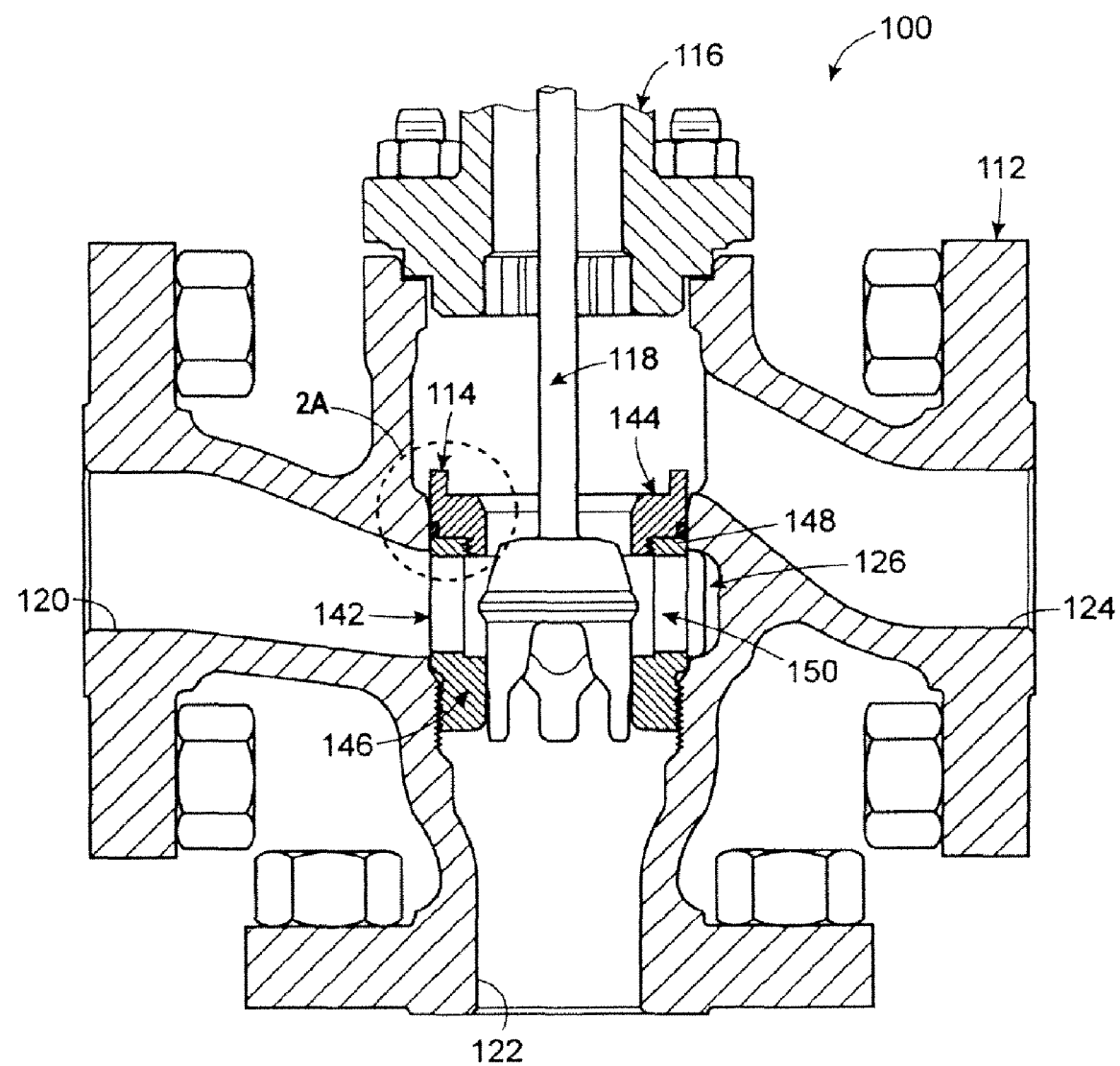
FIG. 2 is a cross-sectional side view of a second embodiment of a fluid flow control device constructed in accordance with the principles of the present invention.
Figure 2A:
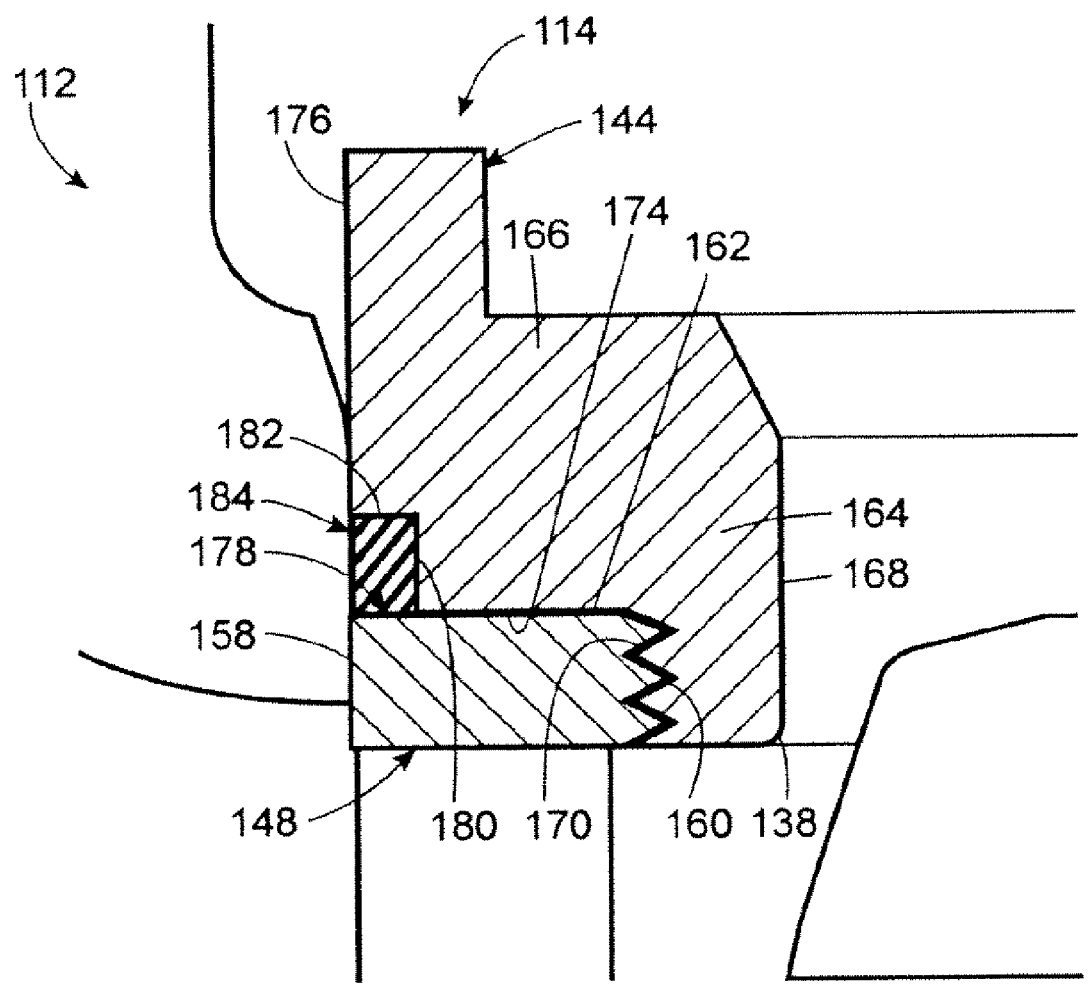
FIG. 2A is a partial detailed view of the fluid flow control device of FIG. 1 taken from circle 2A in FIG. 2.

FIGS. 2 and 2A depict a second embodiment of a fluid flow control device, e.g., a control valve 100, constructed in accordance with the principles of the present invention and adapted to operate at high temperatures, e.g., temperatures of at least 450° F. (232.22° C.). The control valve 100 depicted in FIG. 2 comprises a three-way valve that is similar to the control valve 10 described above with reference to FIGS. 1 and 1A. For example, the control valve 100 comprises a valve body 112, a trim assembly 114, a bonnet 116, and a control element 118. The valve body 112, the bonnet 116, and the control element 118 are identical to the valve body 12, the bonnet 16, and the control element 18 described above with reference to FIG. 1, and therefore, these components will not be described again. The trim assembly 114 of the embodiment of the control valve 100 depicted in FIGS. 2 and 2A, however, is slightly different than the trim assembly 14 described above with reference to FIGS. 1 and 1A.

Specifically, the trim assembly 114 includes a valve seat 142 and a retention ring 144. Similar to the valve seat 42 described above, the valve seat 142 depicted in FIG. 2 comprises a seat ring portion 146, an upper ring portion 148, and a window portion 150. The seat ring portion 146 and the window portion 150 are identical to the seat ring portion 46 and window portion 50 described above with reference to FIG. 1, and therefore, will not be described again. Additionally, similar to the upper ring portion 48 described above with reference to FIGS. 1 and 1A, the upper ring portion 148 depicted in FIGS. 2 and 2A includes a generally ring-shaped member having an outer cylindrical surface 158, a plurality of internal threads 160, and a top surface 162. The retention ring 144 includes a generally ring-shaped member having a fixation portion 164 and a compression portion 166. The fixation portion 164 includes an inner cylindrical surface 168 and a plurality of external threads 170. The inner cylindrical surface 168 defines a second seating surface 138. The plurality of external threads 170 are in threaded engagement with the plurality of internal threads 160 on the upper ring portion 148 of the valve seat 142. The compression portion 166 includes a bottom surface 174 and an outer cylindrical surface 176.

Similar to the trim assembly 14 described above with reference to FIGS. 1 and 1A, a seal 184 is disposed between the retention ring 144 and the upper ring portion 148 of the valve seat 142 to provide a fluid tight seal between the trim assembly 114 and the valve body 112. Unlike the embodiment depicted in FIGS. 1 and 1A, however, the seal 184 of the present embodiment is accommodated within an annular recess 178 formed in the retention ring 144. More specifically, as illustrated in FIG. 2A, the compression portion 166 of the retention ring 144 defines an inner wall 180 and a top wall 182, which, in combination, define the annular recess 178. Therefore, the annular recess 178 accommodates the seal 184 at a location between the retention ring 144 and the upper ring portion 148 of the valve seat 142 and adjacent the outer cylindrical surfaces 176, 158 of the retention ring 144 and upper ring portion 148. As such, the seal 184 can provide a fluid tight seal between the trim assembly 114 and the valve body 112.

For example, as described above with reference to FIGS. 1 and 1A, during operation, a leak path can form between the throat 126 and the third port 124 of the valve body 112. This leak path can extend from the throat 26 through the interface between the plurality of external threads 170 on the fixation portion 164 of the retention ring 144 and the plurality of internal threads 160 on the upper ring portion 148 of the valve seat 142. From here, fluid can leak through the interface between the top surface 162 of the upper ring portion 148 of the valve seat 142 and the bottom surface 174 of the compression portion 166 of the retention ring 144, then through any interface between the outer cylindrical surface 176 of the retention ring 144 and the valve body 112, and finally to the third port 124.

Accordingly, the seal 184, which is disposed within the annular recess 178, provides a fluid tight seal between the trim assembly 114 and the valve body 112, thereby sealing off this potential leak path. The seal 184 is compressed between the top wall 182 of the annular recess 178 of the compression portion 166 of the retention ring 144 and the top surface 162 of the upper ring portion 148 of the valve seat 142. This compression causes the seal 184 sealingly engages the top wall 182 of the annular recess 178 of the compression portion 166 of the retention ring 144 and the top surface 162 of the upper ring portion 148 of the valve seat 142.

Additionally, this compression causes the seal 184 to expand in a direction transverse to the compressive load, such that the seal 184 sealingly engages both the valve body 112 and the inner wall 180 of the annular recess 178 formed in the compression portion 166 of the retention ring 144. Therefore, it should be appreciated that the seal 184 provides a fluid tight seal in every direction, thereby effectively sealing off the above-described leak path between the trim assembly 114 and the valve body 112. The seal 184 described with reference to FIGS. 2 and 2A can be constructed of any of the same materials as, or to have any of the properties, characteristics, and/or geometries of the seal 84 described above with reference to FIGS. 1 and 1A. So constructed, the control valve 100 is capable of operating at temperatures greater than 450° F. (232.22° C.) without raising concern for the integrity of the seal 184.

While the control valves 10, 100 have thus far been described as accommodating a seal 84, 184 within a recess 78, 178 formed in either the upper ring portion 48 of the valve seat 42 (FIGS. 1 and 1A) or in the retention ring 144 (FIGS. 2 and 2A), an alternative embodiment can include recesses in each of the retention ring 44, 144 and the upper ring portion 48, 148 of the valve seat 42, 142. In this configuration, each recess can be sized and configured to accommodate only a portion of the seal 84, 184, such that the combination of recesses are sized and configured to compress the seal 84, 184 and provide an effective fluid tight seal between the trim assembly 14, 114 and the valve body 12, 112, as described herein. For example, in one embodiment, the retention ring 44, 144 can have a first annular recess accommodating the top half, e.g., approximately 50%, of the seal 84, 184 and the upper ring portion 48, 148 of the valve seat 42, 142 can have a second annular recess accommodating the bottom half, e.g., approximately 50%, of the seal 84, 184. In other embodiments, the annular recesses can each accommodate more or less than approximately 50% of the seal 84, 184.

Figure 3:
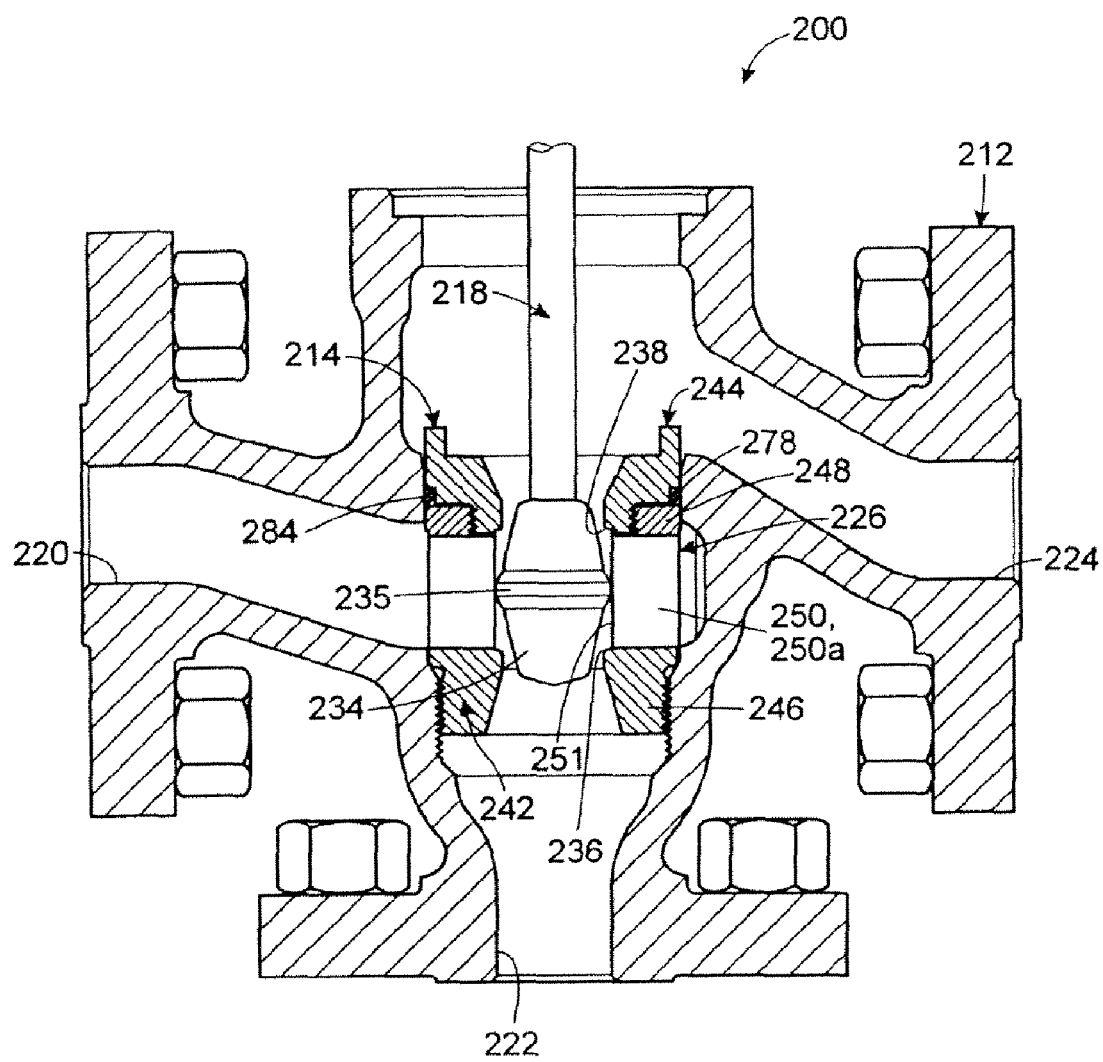
FIG. 3 is a cross-sectional side view of a third embodiment of a fluid flow control device constructed in accordance with the principles of the present invention.

Furthermore, while the control valves 10, 100 have thus far been described as including port-guided valve plugs, the principles of the present invention can also be incorporated into control valves having differently configured control elements. For example, FIG. 3 depicts an alternative embodiment of an unbalanced fluid flow control device, e.g., a control valve 200, constructed in accordance with the principles of the present invention and adapted to operate at high temperatures, e.g., temperatures of at least 450° F. (232.22° C.). The control valve 200 comprises a three-way valve having a valve body 212, a trim assembly 214, a bonnet (not shown), and a control element 218. The valve body 212, trim assembly 214, and bonnet (not shown) can be generally similar to the valve body 112, trim assembly 114, and bonnet (not shown) described above with reference to FIGS. 2 and 2A. That is, the valve body 212 comprises first, second, and third ports 220, 222, 224, and a throat 226. The trim assembly 214 comprises a valve seat 242 and a retention ring 244. Similar to the valve seats 42, 142 described above, the valve seat 242 depicted in FIG. 3 comprises a seat ring portion 246 and an upper ring portion 248 that is separated from the seat ring portion 246 by a window portion 250. The seat ring portion 246 defines a first seating surface 236. The window portion 250 defines a plurality of windows 250a for allowing fluid to flow through the throat 226 and an inner cylindrical surface 251. The retention ring 244 defines a second seating surface 238.

Unlike the previously described embodiments, the control element 218 of the embodiment of the control valve 200 depicted in FIG. 3 does not include a port-guided valve plug, but rather, a parabolic valve plug 234. The parabolic valve plug 234 comprises a sealing ring 235 that is guided by the inner cylindrical surface 251 of the window portion 250 of the valve seat 242, between a first position, where the sealing ring 235 sealingly engages the first seating surface 236, and a second position, where the sealing ring 235 sealingly engages the second seating surface 238.

Otherwise, the configuration of the trim assembly 214 depicted in FIG. 3 is generally identical to the trim assembly 114 depicted in FIGS. 2 and 2A. Most specifically, the retention ring 244 of the trim assembly 214 comprises a recess 278 accommodating a seal 284 to provide a seal between the trim assembly 214 and the valve body 212 in a manner identical to that described with reference to FIGS. 2 and 2A. The seal 284 can be constructed of any of the materials as, or to have the same properties, characteristics, and/or geometries of the seal 84 described above with reference to FIGS. 1 and 1A. Therefore, the control valve 200 is capable of operating at temperatures of at least 450° F. (232.22° C.).

While the trim assembly 214 depicted in FIG. 3 is described as accommodating the seal 284 in a recess 278 formed in the retention ring 244, similar to the embodiment illustrated in FIGS. 2 and 2A, an alternative embodiment of the control valve 200 can include the recess 278 formed in the upper seat ring portion 248 of the valve seat 242, similar to the embodiment depicted in FIGS. 1 and 1A. Moreover, in another embodiment, the trim assembly 214 can be configured such that the upper ring portion 248 of the valve seat 242 includes a first annular recess accommodating a bottom portion of the seal 284, and the retention ring 244 includes a second annular recess accommodating a top portion of the seal 284. The top and bottom portions may or may not be equal to each other.

Figure 4:
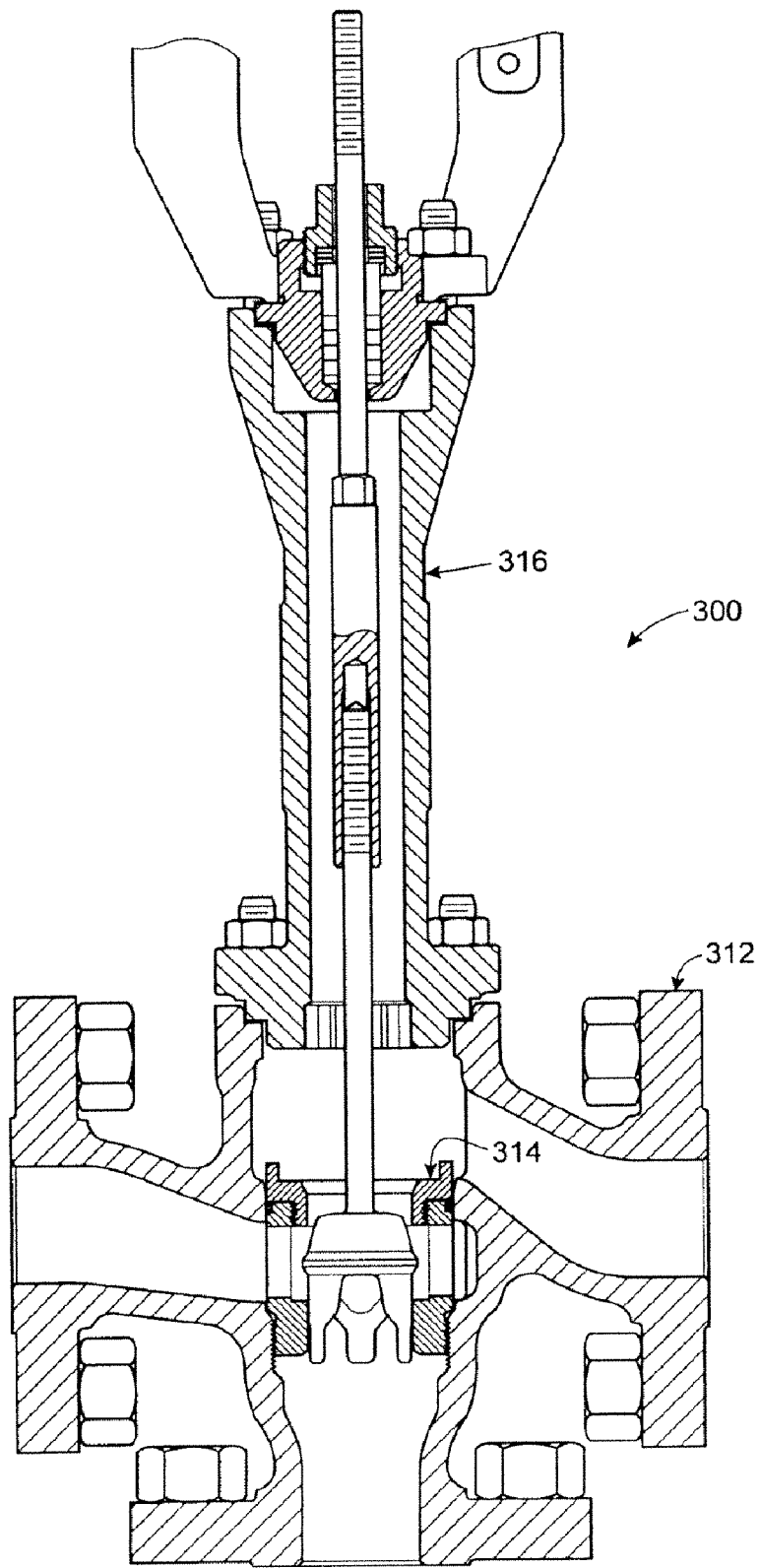
FIG. 4 is a cross-sectional side view of a fourth embodiment of a fluid flow control device constructed in accordance with the principles of the present invention.

FIG. 4 depicts yet another alternative embodiment of a fluid flow control device, e.g., a control valve 300, constructed in accordance with the present invention and adapted to operate at high temperatures, e.g., temperatures of at least 450° F. (232.22° C.). The control valve 300, including the trim assembly 314 thereof, is identical to the control valve 10 described above with reference to FIGS. 1 and 1A. The only distinction is that the control valve 300 depicted in FIG. 4 includes an extension bonnet 316. Therefore, it should be appreciated that control valves having extension bonnets can also be adapted for operating at high temperatures by utilizing high temperature seals constructed at least partly of a graphite material, as described above with reference to the seal 84 of the embodiment depicted in FIGS. 1 and 1A.

Figure 5:
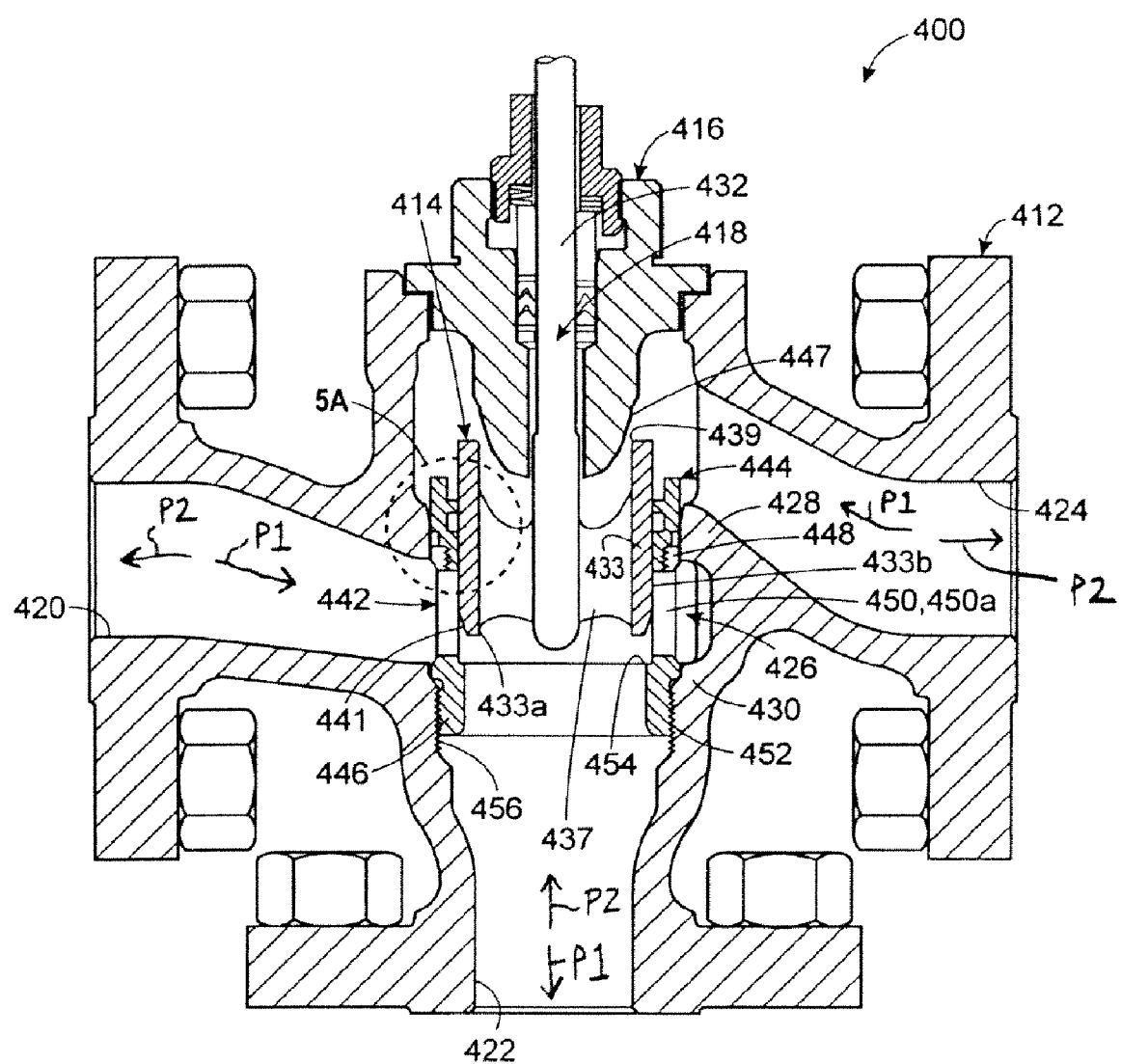
FIG. 5 is a cross-sectional side view of a fifth embodiment of a fluid flow control device constructed in accordance with the principles of the present invention.
Figure 5A:
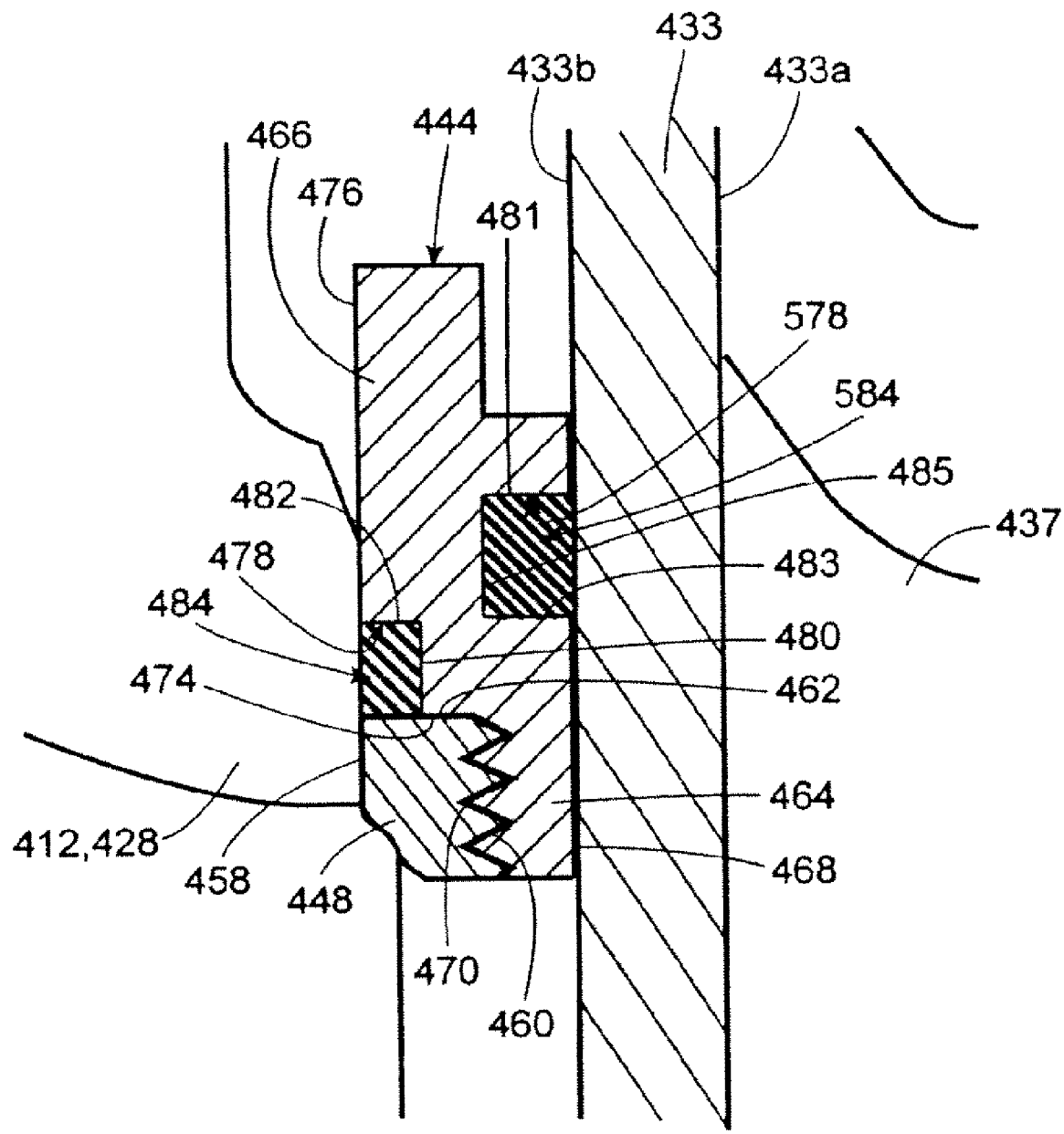
FIG. 5A is a partial detailed view of the fluid flow control device of FIG. 5 taken from circle 5A in FIG. 5.

Moreover, it should be appreciated that the high temperature seals described herein can also be incorporated into a fluid flow control device including a balanced trim and control element assembly. For example, FIGS. 5 and 5A depict a further alternative embodiment of a fluid flow control device, e.g., a control valve 400, constructed in accordance with the principles of the present invention and comprising a balanced trim assembly 414 and control element 418, which are adapted for operation at high temperatures, e.g., temperatures of at least 450° F. (232.22° C.).

The control valve 400 depicted in FIG. 5 includes a valve body 412, the trim assembly 414, a bonnet 416, and the control element 418. The valve body 412 comprises a three-way valve body having first, second, and third ports 420, 422, 424, and a throat 426. In general, the valve body 412 depicted in FIG. 5 is identical to the valve bodies 12, 112, 212, 312 described hereinabove, and as such, also includes upper and lower webs 428, 430. The bonnet 416 is mounted to the valve body 412 in a known manner, and in the disclosed embodiment, comprises a parabolic bonnet 416. The control element 418 comprises a stem 432 and a tubular member 433 attached to the stem 432 by a plurality of webs 437. The tubular member 433 includes an internal cylindrical surface 433a and an external cylindrical surface 433b. The internal cylindrical surface 433a defines an upper seat 439. The external cylindrical surface 433b defines a chamfered lower seat 441.

When the valve 400 serves in a converging application, a flow path, which is identified by reference character P1 in FIG. 5, includes the first and third ports 420, 424 serving as inlet ports, and the second port 422 serving as a common outlet port. In the case of the valve 400 serving a diverging application, a flow path, which is identified by reference character P2 in FIG. 5, includes the second port 422 serving as an inlet port, and the first and third ports 420, 424 serving as outlet ports. So configured, the disclosed embodiment defines the three-way control valve 400 as a "bottom port common" valve.

Similar to the previously described trim assemblies 14, 114, 214, 314, the trim assembly 414 of the balanced embodiment depicted in FIG. 5 comprises a valve seat 442 and a retention ring 444. The valve seat 442 comprises a seat ring portion 446, an upper ring portion 448, and a window portion 450. The seat ring portion 446 is generally ring-shaped and includes a plurality of external threads 452 and a first seating surface 454. The plurality of external threads 452 threadably engage a plurality of internal threads 456 formed on the lower web 430 of the valve body 412. So configured, the seat ring portion 446 fixes the valve seat 442 into the valve body 412, via threaded connection, and against displacement relative thereto. The window portion 450 defines a plurality of windows 450a, which are in fluid communication with the first, second, and third ports 420, 422, 424 of the valve body 412.

The upper ring portion 448 of the valve seat 442 is disposed opposite the throat 426 from the seat ring portion 446 and adjacent to the upper web 428 of the valve body 412. As depicted in FIG. 5A, the upper ring portion 448 includes a generally ring-shaped member having an outer cylindrical surface 458, a plurality of internal threads 460, and a top surface 462. The retention ring 444 is also generally ring-shaped and includes a fixation portion 464 and a compression portion 466. The fixation portion 464 includes an inner cylindrical surface 468 and a plurality of external threads 470. The plurality of external threads 470 are in threaded engagement with the plurality of internal threads 460 on the upper ring portion 448 of the valve seat 442. The compression portion 466 includes a bottom surface 474 and an outer cylindrical surface 476.

Similar to the embodiment described above with reference to FIGS. 2 and 2A, the retention ring 444 of the trim assembly 414 depicted in FIGS. 5 and 5A defines an annular recess 478 accommodating a seal 484. The seal 484 provides a fluid tight seal between the trim assembly 414 and the upper web 428 of the valve body 412. More specifically, as illustrated in FIG. 5A, the compression portion 466 of the retention ring 444 defines an inner wall 480 and a top wall 482, which in combination define the annular recess 478. Therefore, the annular recess 478 accommodates the seal 484 at a location between the retention ring 444 and the upper ring portion 448 of the valve seat 442 and adjacent the outer cylindrical surfaces 476, 458 of the retention ring 444 and upper ring portion 448. As such, the seal 484 can provide a fluid tight seal between the trim assembly 414 and the valve body 412.

For example, as described above with reference to FIGS. 2 and 2A, during operation, a leak path can form between the throat 426 and the third port 424 of the valve body 412. Specifically, fluid can leak from the throat 426 through the interface between the plurality of external threads 470 on the fixation portion 464 of the retention ring 444 and the plurality of internal threads 460 on the upper ring portion 448 of the valve seat 442. From here, fluid can leak through the interface between the top surface 462 of the upper ring portion 448 of the valve seat 442 and the bottom surface 474 of the compression portion 466 of the retention ring 444, then through any interface between the outer cylindrical surface 476 of the retention ring 444 and the upper web 428 of the valve body 412, and finally to the third port 424.

Accordingly, the seal 484 disposed within the annular recess 478 provides a fluid tight seal between the trim assembly 414 and the valve body 412, thereby sealing off this potential leak path. The seal 484 is compressed between the top wall 482 of the annular recess 478 of the compression portion 466 of the retention ring 444 and the top surface 462 of the upper ring portion 448 of the valve seat 442. This compression causes the seal 484 to sealingly engage the top wall 482 of the annular recess 478 of the compression portion 466 of the retention ring 444 and the top surface 462 of the upper ring portion 448 of the valve seat 442.

Additionally, this compression causes the seal 484 to expand in a direction transverse to the compressive load, such that the seal 484 sealingly engages both the upper web 428 of the valve body 412 and the inner wall 480 of the annular recess 478 formed in the compression portion 466 of the retention ring 444. Therefore, it should be appreciated that the seal 484 provides a fluid tight seal in every direction, thereby effectively sealing off the above-described leak path between the trim assembly 414 and the valve body 412.

The seal 484 described with reference to FIGS. 5 and 5A can be constructed of any of the same materials as, or to have any of the properties, characteristics, and/or geometries of the seal 184 described above with reference to FIGS. 2 and 2A, as well as the seal 84 described above with reference to FIGS. 1 and 1A. So constructed, the control valve 400 is capable of operating at temperatures greater than 450° F. (232.22° C.) without raising concern for the integrity of the seal 484.

Additionally, while the annular recess 478 of the embodiment depicted in FIG. 5 has been described as being disposed in the retention ring 444, similar to that which is described above with reference to FIGS. 2 and 2A, alternative embodiments of the control valve 400 can include the recess 478 disposed within the upper ring portion 448 of the valve seat 442, as described above with reference to the embodiment depicted in FIGS. 1 and 1A, for example, or each of the retention ring 44 and the upper ring portion 448 can include an annular recess for accommodating a portion of the seal 484.

Moreover, with the trim assembly 414 of the control valve 400 depicted in FIG. 5 configured as described, the control element 418 is disposed within the valve seat 442 and retention ring 444 such that the external cylindrical surface 433b of the control element 418 is guided by the internal cylindrical surface 468 of the retention ring 444 between a first position, where the chamfered lower seat 441 of the tubular member 433 sealingly engages the first seating surface 454 of the seat ring portion 446 of the valve seat 442, and a second position, where the upper seat 439 of the tubular member 433 sealingly engages a seating surface 447 of the parabolic bonnet 416.

To provide a fluid tight seal between the external cylindrical surface 433b of the tubular member 433 of the control element 418 and the internal cylindrical surface 468 of the retention ring 444, the control valve 400 depicted in FIG. 5 includes a second seal 584. The second seal 584 is accommodated within a second annular recess 578 formed in the retention ring 444 adjacent to the inner cylindrical surface 468 of the fixation portion 466.

More specifically, as illustrated in FIG. 5A, the retention ring 444 defines the second annular recess 578 as being located between a top wall 481, a bottom wall 483, and an inner wall 485. In one embodiment, the top and bottom walls 481, 483 are separated by a distance that is sufficient to retain the second seal 584 in the second annular recess 578 by friction-fit. In another embodiment, the seal 584 can be retained in the second annular recess 578 by some other means, such as an adhesive, for example. Regardless of how the second seal 584 is retained in the second annular recess 578, it provides a fluid tight seal between the external cylindrical surface 433b of the tubular member 433 of the control element 418 and the internal cylindrical surface 468 of the retention ring 444. Because the control element 418 is adapted to move between first and second positions relative to the trim assembly 414, this application of the seal 584 can be considered a dynamic seal.

Finally, to ensure that the control valve 400 depicted in FIG. 5 is capable of operating at high temperatures, e.g., temperature of at least 450° F. (232.22° C.), the second seal 584 is also constructed at least partly of a graphite material. More specifically, the second seal 584 can be constructed of any of the materials as, or to have any of the properties, characteristics, and/or geometries of the seal 84 described above with reference to FIGS. 1 and 1A.

While the seals 84, 184, 284, 384, 484, 584 have been depicted and described herein as comprising generally annular seals having generally rectangular cross-sections similar to the cross-sections of their respective annular recesses 78, 178, 278, 378, 478, 578, alternative embodiments can be designed differently. For example, any of the seals 84, 184, 284, 384, 484, 584 can have a generally circular cross-section, or a generally c-shaped cross-section, or generally any other shape cross-section suitable for serving the principles of the present invention. Moreover, the seals 84, 184, 284, 384, 484, 584 do not necessarily have to have cross-sectional geometries that match the cross-sectional geometries of the respective annular recesses 78, 178, 278, 378, 478, 578. For example, in one embodiment, one or more of the seals 84, 184, 284, 384, 484, 584 can have a generally circular cross-section, while the recesses 78, 178, 278, 378, 478, 578 can have generally rectangular cross-sections.

Further still, it should be appreciated that the trim assemblies 14, 114, 214, 314, 414 described herein can all be installed within valve bodies in generally the same manner, regardless of the type of valve body. For example, using the trim assembly 14 depicted in FIGS. 1 and 1A as an example, one installation method can include installing the entire trim assembly 14 at one time. In this method, the seal 84 can be placed within the annular recess 78 formed on the upper ring portion 48 of the valve seat 42. Then, the retention ring 44 can be loosely threaded onto the upper ring portion 48 of the valve seat 42 just short of compressing the seal 84. The valve seat 42, seal 84, and retention ring 44 can then be dropped into the valve body 12 via the orifice where the bonnet 16 is attached such that the external threads 52 on the seat ring portion 46 of the valve seat 42 threadably engage the internal threads 56 on the lower web 30 of the valve body 12. Using a tool, a technician can turn the retention ring 44 to simultaneously tighten the seat ring portion 46 into the lower web 30, and the retention ring 44 to the upper ring portion 48, thereby compressing the seal 84 into sealing engagement with the upper web 28 of the valve body 12.

In an alternative installation method, the valve seat 42, the seal 84, and the retention ring 44 can be separately installed in the valve body 12. For example, first the valve seat 42 can be positioned into the valve body 12 such that the external threads 52 on the seat ring portion 46 become threadably engaged with the internal threads 56 on the lower web 30 of the valve body 12. A technician can then use a tool to grasp lugs or holes in the seat ring portion 46 to tighten the valve seat 42 into the valve body 12. Once the valve seat 42 is tightened, the technician can place the seal 84 inside the annular recess 78 formed in the upper ring portion 48 of the valve seat 42. Finally, the technician can thread the retention ring 44 into the upper ring portion 48 to compress the seal 84 and provide the fluid tight seal between the upper web 28 of the valve body 12 and the trim assembly 14.

Figure 8:
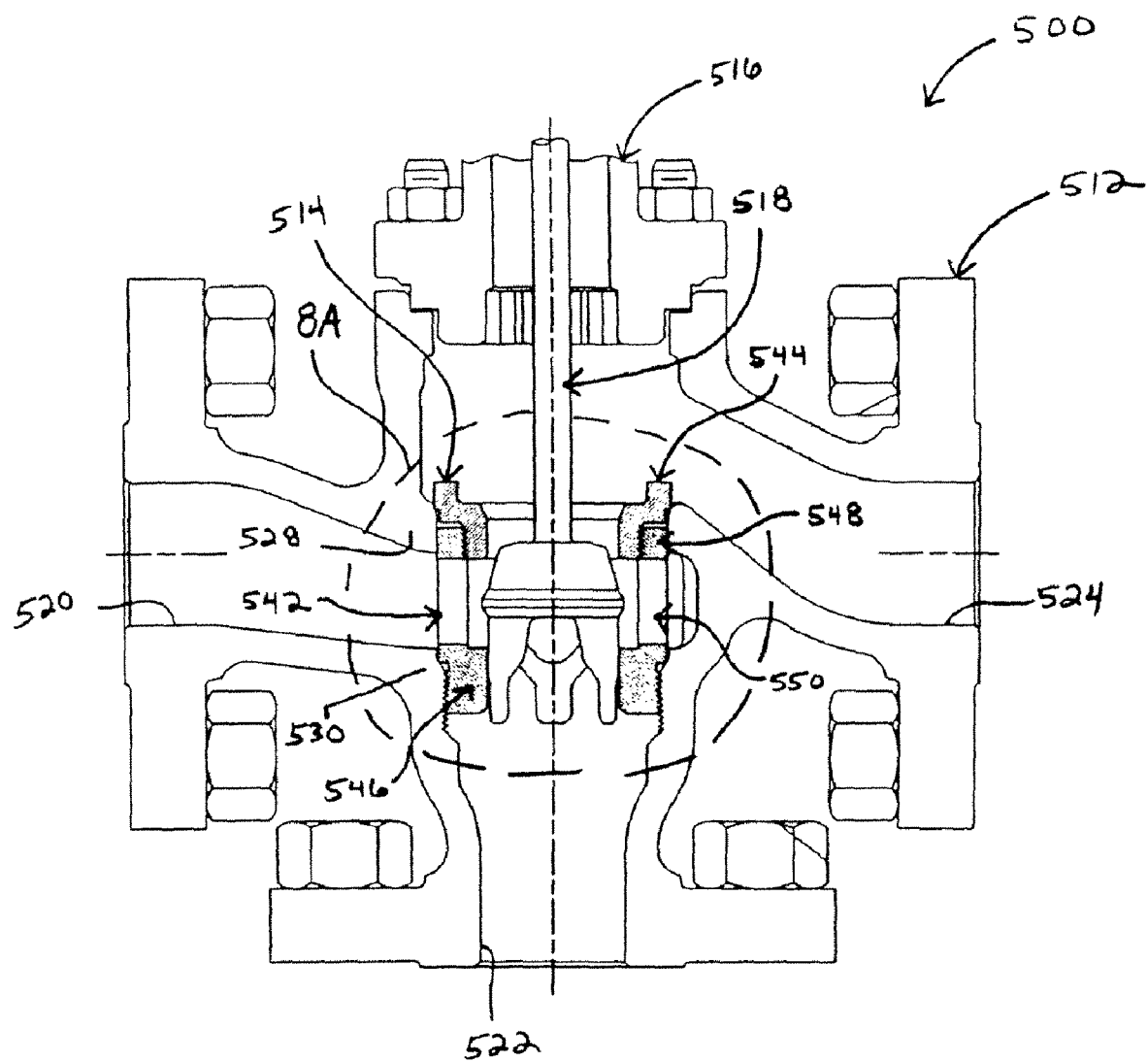
FIG. 8 is a cross-sectional side view of a sixth embodiment of a fluid flow control device constructed in accordance with the principles of the present invention.
Figure 8A:
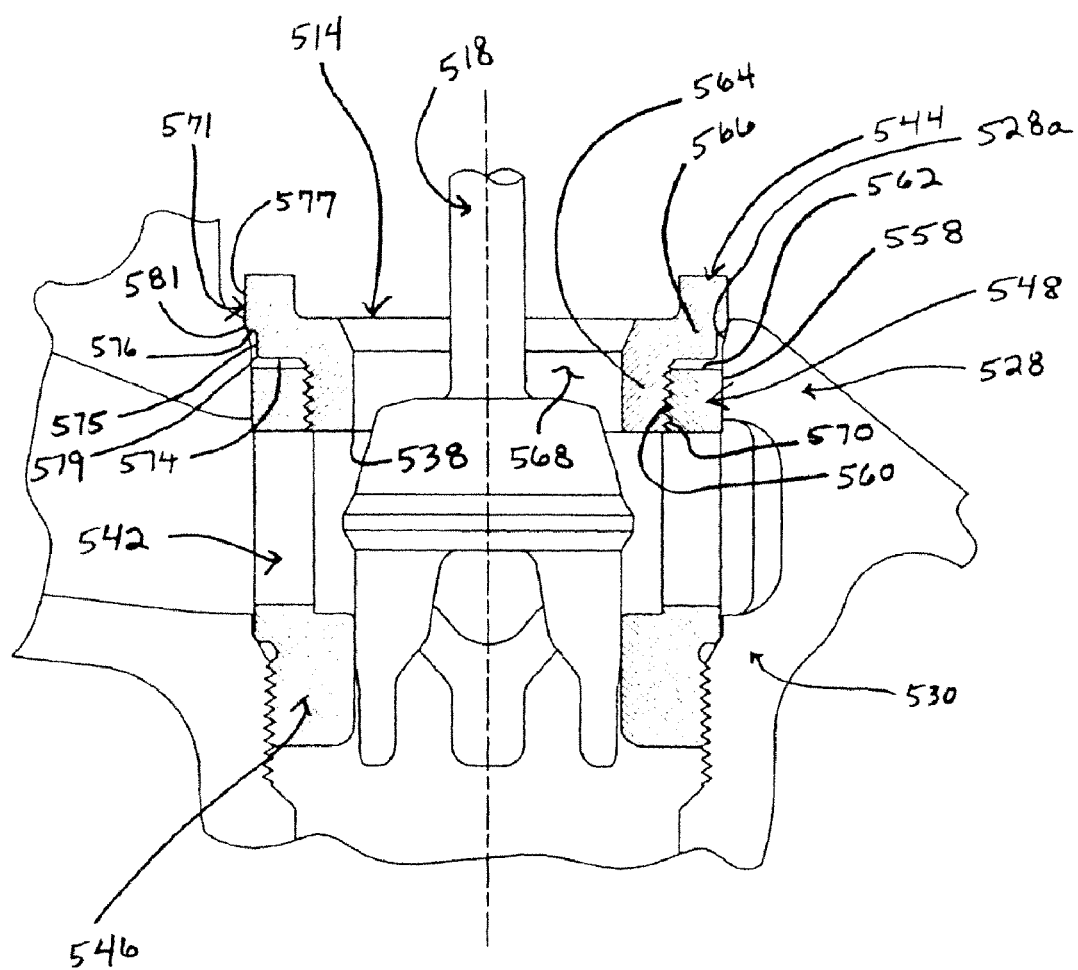
FIG. 8A is a partial detailed view of the fluid flow control device of FIG. 8 taken from circle 8A in FIG. 8.

While the above-described embodiments of high-temperature control valves 10, 100, 200, 300, 400 each include at least some form of a seal compressed between the retention ring and the upper ring portion of the respective trim assemblies, FIGS. 8 and 8A depicted an alternative embodiment of a high-temperature control valve 500 without such a seal.

Specifically, FIGS. 8 and 8A depict an embodiment of a control valve 500 comprising a three-way valve that is similar to the control valves 10, 100 described above with reference to FIGS. 1 and 1A, and FIGS. 2 and 2A. The control valve 500 comprises a valve body 512, a trim assembly 514, a bonnet 516, and a control element 518. The bonnet 516 and the control element 518 are identical to the bonnets 16, 116 and the control elements 18, 118 described above with reference to FIGS. 1, 1A, 2, and 2A, and therefore, these components will not be described again.

The valve body 512 is generally identical to the valve bodies described above in FIGS. 1, 1A, 2, and 2A, in that it includes first, second, and third ports 520, 522, 524, a throat 526, and upper and lower webs 528, 530. As shown in FIG. 8A, the upper web 528 additionally can include a tapered surface 528a. The trim assembly 514 of the embodiment of the control valve 500 depicted in FIGS. 8 and 8A, however, is slightly different than the trim assemblies 14, 114 described above with reference to FIGS. 1, 1A, 2, and 2A.

Specifically, the trim assembly 514 includes a valve seat 542 and a retention ring 544. Similar to the valve seats described above, the valve seat 542 depicted in FIG. 8 comprises a seat ring portion 546, an upper ring portion 548, and a window portion 550. The seat ring portion 546 and the window portion 550 are identical to the seat ring portion 46 and window portion 50 described above with reference to FIG. 1, and therefore, will not be described again. Additionally, similar to the upper ring portion 48 described above with reference to FIGS. 1 and 1A, the upper ring portion 548 depicted in FIGS. 8 and 8A includes a generally ring-shaped member having an outer cylindrical surface 558, a plurality of internal threads 560, and a top surface 562.

As illustrated in FIG. 8A, the retention ring 544 of the present embodiment includes a generally ring-shaped member having a fixation portion 564 and a stepped shoulder portion 566. The fixation portion 564 includes an inner cylindrical surface 568 and a plurality of external threads 570. The inner cylindrical surface 568 defines a second seating surface 538. The plurality of external threads 570 are in threaded engagement with the plurality of internal threads 560 on the upper ring portion 548 of the valve seat 542 to secure the retention ring 544 to the valve seat 542.

As illustrated in FIG. 8A, the stepped shoulder portion 566 of the retention ring 544 includes an external surface 571 with a stepped side profile comprising first and second bottom surfaces 574, 576 and first and second external surfaces 575, 577. In the disclosed embodiment the first and second bottom surfaces 574, 576 are generally perpendicular to the first and second external surfaces 575, 577 such that the stepped shoulder portion 566 of the retention ring 544 defines a first ring-shaped shoulder 579 and a second ring-shaped shoulder 581. The first shoulder 579 is disposed at the intersection of the first bottom surface 574 and the first external surface 575. The second shoulder 581 is disposed at the intersection of the second bottom surface 576 and the second external surface 577. In the disclosed embodiment, the first and second shoulders 579, 581 can have rounded cross-sections, thereby defining bull-nosed surfaces.

As mentioned, the retention ring 544 is threaded into the upper ring portion 548 of the valve seat 542 such that the external threads 570 on the fixation portion 564 of the retention ring 544 threadably engage the internal threads 560 on the upper ring portion 548 of the valve seat 542. In a preferred embodiment, the retention ring 544 is secured into the upper ring portion 548 with sufficient torque that the second ring-shaped shoulder 581 formed on the shoulder portion 566 of the retention ring sealingly engages the tapered surface 528a of the upper web 528 of the valve body 512, as depicted. The engagement is preferably accomplished with a force sufficient to effect a metal-to-metal fluid-tight seal between the second ring-shaped shoulder 581 and the upper web 528. As such, the retention ring 544 can provide a fluid tight seal between the trim assembly 514 and the valve body 112 without requiring the incorporation of a seal, such as one of the seals 84, 184, for example, described above.

For example, during operation of a conventional control valve, a leak path can form between the throat 526 and the third port 524 of the valve body 512. This leak path can extend from the throat 526 through the interface between the plurality of external threads 570 on the fixation portion 564 of the retention ring 544 and the plurality of internal threads 560 on the upper ring portion 548 of the valve seat 542. From here, fluid can leak through the interface between the top surface 562 of the upper ring portion 548 of the valve seat 542 and the stepped shoulder portion 566 of the retention ring 544, then through any interface between the retention ring 544 and the valve body 512, and finally to the third port 524.

The second ring-shaped shoulder 581 of the control valve 500 just described therefore provides at least a line-contact, fluid tight seal between the trim assembly 514 and the valve body 512 to seal off this potential leak path. So constructed, the control valve 500 is capable of operating at temperatures greater than 450° F. (232.22° C.) without raising concern for the integrity of any of the components of the trim assembly 514. In one embodiment, the second ring-shaped shoulder 581 and/or the tapered surface 528a of the upper web 528 of the valve body 512 can be constructed of a malleable material such that the above-described engagement can provide a metal-to-metal surface contact.

While the control valve 500 has been disclosed in FIGS. 8 and 8A as including a trim assembly 514 that does not require the incorporation of a separate seal between the retention ring 544 and the upper ring portion 548 of the valve seat 542, such as one of the seals 84, 184 constructed of a graphite material described above, for example, an alternative embodiment of the control valve 500 can be equipped with such a seal. For example, the retention ring 544 of the control valve 500 depicted in FIGS. 8 and 8A could be adapted to accommodate a seal similar to seal 184 depicted in FIG. 2A between the first bottom surface 574 of the shoulder portion 566 and the top surface 562 of the upper ring portion 548 of the valve seat 542. So configured, the seal can be compressed between the retention ring 544 and the upper ring portion 548 such that it sealingly engages the upper web 528 of the valve body 512 in a manner similar to that described above with reference to FIGS. 2 and 2A. In another alternative embodiment, the retention ring 544 described with reference to FIGS. 8 and 8A can be slightly modified such that the first bottom surface 574 is positioned in contact with the top surface 562 of the upper ring portion 548 of the valve seat 542 such that the upper ring portion 548 can include a recess for accommodating a graphite seal, similar to the embodiment described above with reference to FIGS. 1 and 1A. Any embodiment incorporating the metal-to-metal seal provided by the retention ring 544 described with reference to FIGS. 8 and 8A in combination with a graphite seal, as described, can provide additional sealing capabilities while continuing to eliminate any concern for the integrity of the trim assembly 514 at temperatures greater than 450° F. (232.22° C.).

While the control valve 500 described with reference to FIGS. 8 and 8A is depicted as including an unbalanced control valve similar to that described above with reference to FIGS. 1, 1A, 2, and 2A, it should be appreciated that alternative embodiments can be configured with a parabolic valve plug similar to FIG. 3, or an extended bonnet similar to FIG. 4.

Moreover, it should be appreciated that the balanced control valve described above with reference to FIGS. 5 and 5A can also be modified to include the concept described with reference to FIGS. 8 and 8A. For example, the retention ring 444 could be modified to replace the first seal 484 with a stepped shoulder portion similar to the stepped shoulder portion 566 of the retention ring 544 depicted in FIGS. 8 and 8A.

While the various embodiments of the trim assembly 14, 114, 214, 314, 414, 514 have been described herein as being installed within valve bodies 12, 112, 212, 312, 412, 512 the present invention is not limited to the combination of the trim assembly 14, 114, 214, 314, 414, 514 with the respective valve bodies 12, 112, 212, 312, 412, 512, but rather, the trim assemblies 14, 114, 214, 314, 414, 514 themselves constitute inventive contributions. As such, it should be appreciated that the trim assemblies 14, 114, 214, 314, 414, 514 can be installed within valve bodies that are different from the valve bodies 12, 112, 212, 312, 412, 512 described herein.

In light of the foregoing, it should be appreciated that a fluid flow control device constructed in accordance with the principles of the present invention is capable of operating at temperatures greater than 450° F. (232.22° C.) without raising concern for the integrity of the one or more seals contained therein. Furthermore, it should be appreciated that the various fluid flow control devices described herein are mere examples of devices that can embody the invention, but the invention is not intended to limited thereby. Instead, the present invention is only to be defined by the spirit and scope of the following claims and any and all equivalents thereof.

What is claimed:

1. A fluid flow control device, comprising:
  a valve body defining an inlet, an outlet, and a throat disposed between the inlet and the outlet;
  a control element disposed within the throat of the valve body and adapted for displacement between a first position and a second position for controlling the flow of fluid through the valve body;
  a trim assembly comprising a valve seat and a retention ring, the valve seat fixed to the valve body within the throat, the retention ring threadably connected to the valve seat; and
  a seal comprising a graphite material, the seal compressed between the valve seat and the retention ring and engaging the valve body to provide a fluid tight seal between the trim assembly and the valve body wherein the valve seat comprises a seat ring portion and an upper ring portion disposed opposite the throat from the seat ring portion, the seat ring portion threadably connected to the valve body and defining a first seating surface adapted to be engaged by the control element when the control element is in the first position, the upper ring portion threadably connected to the retention ring wherein the retention ring defines a second seating surface adapted to be engaged by the control element when the control element is in the second position.

2. The device of claim 1, wherein the seal is constructed to withstand a temperature of at least 450° F. (232.22° C.).

3. The device of claim 1, wherein the seal further comprises a non-metallic, inorganic, passivating inhibitor for corrosion and oxidation resistance.

4. The device of claim 1, wherein the seal comprises a density in the range of approximately 85 lb/ft$^3$ (1362 kg/m$^3$) to approximately 95 lb/ft$^3$ (1522 kg/m$^3$).

5. The device of claim 1, wherein the seal comprises at least 90% graphite.

6. The device of claim 1, wherein the seal comprises a wound graphite ribbon.

7. The device of claim 1, wherein the seal comprises alternating layers of flexible graphite sheets and polytetrafluoroethylene sheets.

8. The device of claim 1, wherein the upper ring portion of the valve seat comprises an annular recess accommodating the seal at a location between the trim assembly and the valve body.

9. The device of claim 1, wherein the retention ring comprises an annular recess accommodating the seal at a location between the trim assembly and the valve body.

10. The device of claim 1, wherein the retention ring defines an inner cylindrical surface adapted to guide the control element between the first and second positions.

11. The device of claim 10, further comprising a piston ring comprising a graphite material, the piston ring disposed between the inner cylindrical surface of the retention ring and the control element to provide a fluid tight seal between the trim assembly and the control element.

12. The device of claim 11 wherein the retention ring defines an annular recess adjacent to the inner cylindrical surface, the annular recess accommodating the piston ring.

13. A fluid flow control device, comprising:
  a valve body defining an inlet, an outlet, and a throat disposed between the inlet and the outlet;
  a control element disposed within the throat of the valve body and adapted for displacement between a first position and a second position for controlling the flow of fluid through the valve body;
  a valve seat fixed against axial displacement relative to the valve body, the valve seat comprising a seat ring portion and an upper ring portion disposed opposite the throat from the seat ring portion, the seat ring portion defining a first seating surface adapted to be engaged by the control element when the control element is in the first position;
  a retention ring threadably connected to the upper ring portion of the valve seat, the retention ring defining a second seating surface adapted to be engaged by the control element when the control element is in the second position;

an annular recess formed in at least one of the upper ring portion of the valve seat and the retention ring, the annular recess disposed adjacent to the valve body; and a seal comprising a graphite material, the seal disposed within the annular recess and in engagement with the valve body to provide a fluid tight seal between the annular recess and the valve body.

14. The device of claim 13 wherein the seal is compressed between the retention ring and the upper ring portion of the valve seat.

15. The device of claim 13 wherein the seal is constructed to withstand a temperature of at least 450° F. (232.22° C.).

16. The device of claim 13, wherein the seal further comprises a non-metallic, inorganic, passivating inhibitor for corrosion and oxidation resistance.

17. The device of claim 13, wherein the seal comprises a density in the range of approximately 85 lb/ft$^3$ (1362 kg/m$^3$) to approximately 95 lb/ft$^3$ (1522 kg/m$^3$).

18. The device of claim 13, wherein the seal comprises at least 90% graphite.

19. The device of claim 13, wherein the seal comprises a wound graphite ribbon.

20. The device of claim 13, wherein the seal comprises alternating layers of flexible graphite sheets and polytetrafluoroethylene sheets.

21. The device of claim 13, wherein the seat ring portion of the valve seat is threadably connected to the valve body.

22. The device of claim 13, wherein the control element comprises an unbalanced valve plug and the retention ring defines a second seating surface adapted to be engaged by the control element when the control element is in the second position.

23. The device of claim 13, wherein the control element comprises a balanced valve plug and the retention ring defines an inner cylindrical surface adapted to guide the control element between the first and second positions.

24. The device of claim 23, further comprising a piston ring disposed within an annular recess formed adjacent the inner cylindrical surface of the retention ring and the control element for providing a fluid tight seal between the trim assembly and the control element, the piston ring comprising a graphite material.

25. A trim assembly adapted to be installed within a fluid flow control device comprising a valve body and a control element, the valve body defining an inlet, an outlet, and a throat disposed between the inlet and the outlet, the control element disposed within the throat and adapted to be displaced between a first position and a second position for controlling the flow of fluid through the valve body, the trim assembly comprising:

a valve seat adapted to be threadably connected to the valve body adjacent to the throat, the valve seat comprising a seat ring portion and an upper ring portion, the seat ring portion defining a first seating surface adapted to be engaged by the control element when the control element is in the first position, the upper ring portion defining an outer cylindrical surface and an inner cylindrical surface and adapted to be disposed opposite the throat from the seat ring portion;

a retention ring threadably connected to the upper ring portion of the valve seat and defining an outer cylindrical surface;

an annular recess formed in the outer cylindrical surface of one of the upper ring portion of the valve seat and the retention ring; and a seal comprising a graphite material disposed within the annular recess and adapted to be compressed between the retention ring and the upper ring portion of the valve seat wherein the retention ring defines a second seating surface adapted to be engaged by the control element when the control element is in the second position.

26. The device of claim 25, wherein the seal is constructed to withstand a temperature of at least 450° F. (232.22° C.).

27. The device of claim 25, wherein the graphite material of the seal comprises a non-metallic, inorganic, passivating inhibitor for corrosion and oxidation resistance.

28. The device of claim 25, wherein the seal comprises a density in the range of approximately 85 lb/ft$^3$ (1362 kg/m$^3$) to approximately 95 lb/ft$^3$ (1522 kg/m$^3$).

29. The device of claim 25, wherein the seal comprises at least 90% graphite.

30. The device of claim 25, wherein the seal comprises a wound graphite ribbon.

31. The device of claim 25, wherein the seal comprises alternating layers of flexible graphite sheets and polytetrafluoroethylene sheets.

32. The device of claim 25, further comprising a piston ring comprising a graphite material, the piston ring disposed within an annular recess formed adjacent to the inner cylindrical surface of the retention ring and the control element to provide a fluid tight seal between the trim assembly and the control element.

33. A fluid flow control device, comprising:

a valve body defining an inlet, an outlet, and a throat disposed between the inlet and the outlet;

a control element disposed within the throat of the valve body and adapted for displacement between a first position and a second position for controlling the flow of fluid through the valve body;

a trim assembly comprising:

a valve seat fixed against axial displacement relative to the valve body, the valve seat comprising a seat ring portion and an upper ring portion disposed opposite the throat from the seat ring portion, the seat ring portion defining a first seating surface adapted to be engaged by the control element when the control element is in the first position, and a retention ring threadably connected to the upper ring portion of the valve seat, the retention ring defining a second seating surface adapted to be engaged by the control element when the control element is in the second position; and a fluid tight seal defined at an interface between the trim assembly and the valve body at a location adjacent to the retention ring, the fluid tight seal provided by at least one of the following:

an annular seal comprising a graphite material that is compressed between the retention ring and the upper ring portion of the valve seat, the annular seal sealingly engaging the valve body, and a metal-to-metal contact between an external surface of the retention ring and the valve body.

34. The device of claim 33, wherein the fluid-tight seal can withstand a temperature of at least 450° F. (232.22° C.).

35. The device of claim 33, wherein the annular seal comprises at least 90% graphite.

36. The device of claim 33, wherein the annular seal comprises a wound graphite ribbon.

37. The device of claim 33, wherein the annular seal comprises alternating layers of flexible graphite sheets and polytetrafluoroethylene sheets.

38. The device of claim 33, wherein one of the upper ring portion of the valve seat and the retention ring comprises an annular recess accommodating the annular seal at a location between the trim assembly and the valve body.

39. The device of claim 33, wherein the retention ring comprises a stepped side profile defining a shoulder surface in line contact with the upper web of the valve body.

* * * * *

UNITED STATES PATENT AND TRADEMARK OFFICE
CERTIFICATE OF CORRECTION

| | | |
|---|---|---|
| PATENT NO. | : 7,854,239 B2 | Page 1 of 1 |
| APPLICATION NO. | : 12/041169 | |
| DATED | : December 21, 2010 | |
| INVENTOR(S) | : William E. Wears et al. | |

It is certified that error appears in the above-identified patent and that said Letters Patent is hereby corrected as shown below:

At Column 14, line 8, "body wherein" should be -- body; wherein --.

At Column 14, line 15, "ring wherein" should be -- ring; wherein --.

At Column 16, line 7, "seat wherein" should be -- seat; wherein --.

Signed and Sealed this
Twenty-first Day of June, 2011

David J. Kappos
*Director of the United States Patent and Trademark Office*